(12) United States Patent
Ishii et al.

(10) Patent No.: US 8,244,940 B2
(45) Date of Patent: Aug. 14, 2012

(54) PERIPHERAL DEVICE AND METHOD OF CONNECTING PERIPHERAL DEVICE WITH HOST DEVICE

(75) Inventors: Suguru Ishii, Nagoya (JP); Tsukasa Ito, Nagoya (JP); Kenji Kato, Nagoya (JP)

(73) Assignee: Buffalo Inc., Nagoya (JP)

(*) Notice: Subject to any disclaimer, the term of this patent is extended or adjusted under 35 U.S.C. 154(b) by 0 days.

(21) Appl. No.: 13/095,768

(22) Filed: Apr. 27, 2011

(65) Prior Publication Data

US 2011/0271019 A1    Nov. 3, 2011

(30) Foreign Application Priority Data

Apr. 28, 2010  (JP) ................. 2010-103073

(51) Int. Cl.
  *G06F 13/12*  (2006.01)
  *G06F 13/42*  (2006.01)
(52) U.S. Cl. .......................... 710/63; 710/105
(58) Field of Classification Search ............ 710/63, 710/105
  See application file for complete search history.

(56) References Cited

U.S. PATENT DOCUMENTS

| | | | |
|---|---|---|---|
| 6,230,283 B1* | 5/2001 | Gambino | 714/12 |
| 2003/0135622 A1* | 7/2003 | Anderson et al. | 709/227 |
| 2006/0105712 A1* | 5/2006 | Glass et al. | 455/41.2 |
| 2007/0079033 A1* | 4/2007 | Kim et al. | 710/105 |

FOREIGN PATENT DOCUMENTS

| | | |
|---|---|---|
| JP | 2003-131956 | 5/2003 |
| JP | 2004/152156 A | 5/2004 |
| JP | 2005-173820 A | 6/2005 |

OTHER PUBLICATIONS

"Universal Serial Bus", http://ja.wikipedia.org/wiki/Universal_Serial_Bus, downloaded Mar. 26, 2010.
"USB 3.0", http://monoist.atmarkit.co.jp/feledev/articles/mononews/05/mononews05_a.html, downloaded Mar. 30, 2010.
Notice of Reason for Rejection from Japanese Application No. JP2010-103073 mailed Jan. 31, 2012.

* cited by examiner

*Primary Examiner* — Henry Tsai
*Assistant Examiner* — Hyun Nam
(74) *Attorney, Agent, or Firm* — Beyer Law Group LLP

(57) ABSTRACT

A peripheral device of the invention is capable of data communication with a host device via one of a first-type interface and a second-type interface having different data communication-related specifications. The peripheral device has a single connector for making electric connection selectively with a first-type connector or a second-type connector. The peripheral device also has a controller for performing an initial connection process that makes a logical connection between the peripheral device and the host device via the first-type interface or the second-type interface. While the physical connection is maintained, the controller breaks the logical connection established by the initial connection process and subsequently makes another logical connection between the peripheral device and the host device.

10 Claims, 6 Drawing Sheets

PERIPHERAL DEVICE AND METHOD OF CONNECTING PERIPHERAL DEVICE WITH HOST DEVICE

CROSS-REFERENCE TO RELATED APPLICATIONS

The present application claims priority to Japanese Patent Application No. 2010-103073, filed on Apr. 28, 2010, the disclosure of which is incorporated by reference in its entirety.

BACKGROUND OF THE INVENTION

1. Field of the Invention

The present invention relates to a peripheral device to be connected with a host device, and a method of connecting a peripheral device with a host device.

2. Description of the Related Art

A peripheral device, such as an external storage device, is connected with a host device, such as a personal computer via one of various available interfaces to perform data communication. USB interfaces are known as of such available interfaces. Among the USB interfaces, USB 3.0-compliant interfaces (hereafter referred to as 'USB 3.0 interfaces') have recently spread widely, in addition to USB 2.0-compliant interfaces (hereafter referred to as 'USB 2.0 interfaces').

The USB 2.0 and USB 3.0 standards have different data communication-related specifications, such as, for example, a communication mode (half-duplex system or full-duplex system) and the number of signal lines. The USB 2.0 interface has a data transmission rate of 480 Mbps at the maximum, while the USB 3.0 interface has a data transmission rate of 5 Gbps at the maximum. The USB 3.0 interface accordingly enables higher-speed data communication, compared with the USB 2.0 interface. The USB 3.0 interface has downward compatibility in physical use of a port. Both a USB male connector compliant with USB 2.0 (hereafter referred to as 'USB 2.0 connector') and a USB male connector compliant with USB 3.0 (hereafter referred to as 'USB 3.0 connector') are connectable to a USB port compliant with USB 3.0 (hereafter referred to as 'USB 3.0 port).

SUMMARY

After the physical connection has been between a host device and a peripheral device by inserting USB 3.0 connectors into both USB 3.0 ports of the host device and the peripheral device, a process of logical connection between the peripheral device and the host device may sometimes be finished before the completion of electrical connection between respective USB 3.0-compliant terminals. In this case, the host device falsely recognizes the peripheral device as a USB 2.0 device designed to conduct data communication via a USB 2.0 interface. The process of logical connection between the peripheral device and the host device should be performed again, in order to conduct data communication via a USB 3.0 interface. For this purpose, a USB 3.0 cable must be disconnected from and connected again into, the USB 3.0 port. Such disconnected and re-connecting actions are, however, rather troublesome for the user, and it is undesirable to force the user to take such disconnecting and re-connecting actions. This problem is not restricted to peripheral devices capable of using the USB 2.0 interface or the USB 3.0 interface, but common to peripheral devices equipped with a single connector to which different types of interface having different data-communication-related specifications can be connected.

By taking into account the problem discussed above, there is a requirement for a peripheral device to break a logical connection once made with a host device and subsequently make another logical connection with the host device without breaking and immediately making a physical connection between the peripheral device and the host device.

In order to fulfill the requirement described above, the present invention provides various embodiments and applications described below.

[Application 1]

A peripheral device capable of data communication with a host device via one of a first-type interface and a second-type interface having different data-communication-related specifications, comprising:

a single connector capable of being connected selectively with one of a first-type connector corresponding to the first-type interface and a second-type connector corresponding to the second-type interface; and a controller for performing an initial connection process that is started by a signal sent from the host device when the peripheral device and the host device are physically connected with each other by using one of the first-type connector and the second-type connector, and that makes a logical connection between the peripheral device and the host device via one of the first-type interface and the second-type interface, wherein the controller can perform a reconnection process that breaks the logical connection made by the initial connection process and then makes the logical connection between the peripheral device and the host device, while the physical connection is maintained.

According to the peripheral device in accordance with the first application of the invention, a process for making a logical connection can be performed again in order to conduct data communication by using a desired interface without forcing the user to break the physical connection once made. If the process of making a logical connection is usually performed in some time after a physical connection was made, then the possibility of a desired interface being formed becomes higher. Therefore, by performing a re-connection process after the initial connection process, the possibility of an erroneous interface being formed can be decreased.

[Application 2]

The peripheral device in accordance with the first aspect, wherein the second-type interface has a higher data transmission rate than the first-type interface, and when the controller identified the logical connection formed by the initial connection process as a connection via the first-type interface, the controller performs the reconnection process, and when the controller identified the logical connection formed by the initial connection process as a connection via the second-type interface, the controller does not perform the reconnection process.

According to the peripheral device in accordance with the second application of the invention, the process of forming the logical connection can be performed again, in order to conduct data communication via an interface having a higher data transmission rate.

[Application 3]

The peripheral device in accordance with the first application, wherein the controller performs both the initial connection process and the reconnection process, irrespective of whether the first-type connector or the second-type connector is used to make the physical connection between the peripheral device and the host device is made by using one of the first-type connector and the second-type connector.

According to the peripheral device of the third application, the process of making a logical connection can be performed again, in order to conduct data communication via a desired interface, while the control of the peripheral device being simplified.

[Application 4]

The peripheral device in accordance with the first application, wherein the reconnection process includes a step of breaking the logical connection formed by the initial connection process as a result of the controller having entered into its initial state.

According to the peripheral device of the fourth application, the logical connection made between the peripheral device and the host device can be broken by rendering the operating state of the controller to the initial state.

[Application 5]

The peripheral device in accordance with the first application, wherein the reconnection process performed by the controller includes a step of breaking the logical connection formed by the initial connection process by causing the host device to send a bus reset signal to the peripheral device.

According to the peripheral device of the fifth application, the logical connection formed between the peripheral device the host device can be broken by causing the host device to send the bus reset signal to the peripheral device. This constitution does not require the startup of the controller from its initial state and thus enables the reconnection process to be completed within a shorter time period, as compared with the case where the logical connection is broken by rendering the state of the controller to its initial state.

[Application 6]

The peripheral device in accordance with the first application, wherein the first-type interface complies with USB 2.0, and the second-type interface complies with USB 3.0.

According to the peripheral device of the sixth application, the process can be performed again which makes logical connections by means of the USB 2.0- and 3.0-compliant interfaces, without forcing the user to carry out the operation for breaking the physical connection.

The invention can be implemented not only as the peripheral device described above but also as a method for connecting an interface between a peripheral device and a host device, a method for controlling a peripheral device, and a computer program for controlling a peripheral device. The computer program may be recorded in a computer-readable recording medium. Any of various media, such as a magnetic disk, an optical disk, a memory card, or a hard disk, may be used as the recording medium.

These and other objects, features, aspects, and advantages of the invention will become more apparent when the following detailed description of the embodiments is read with reference to the accompanying drawings.

DETAILED DESCRIPTION OF THE EMBODIMENT

Figure 1:
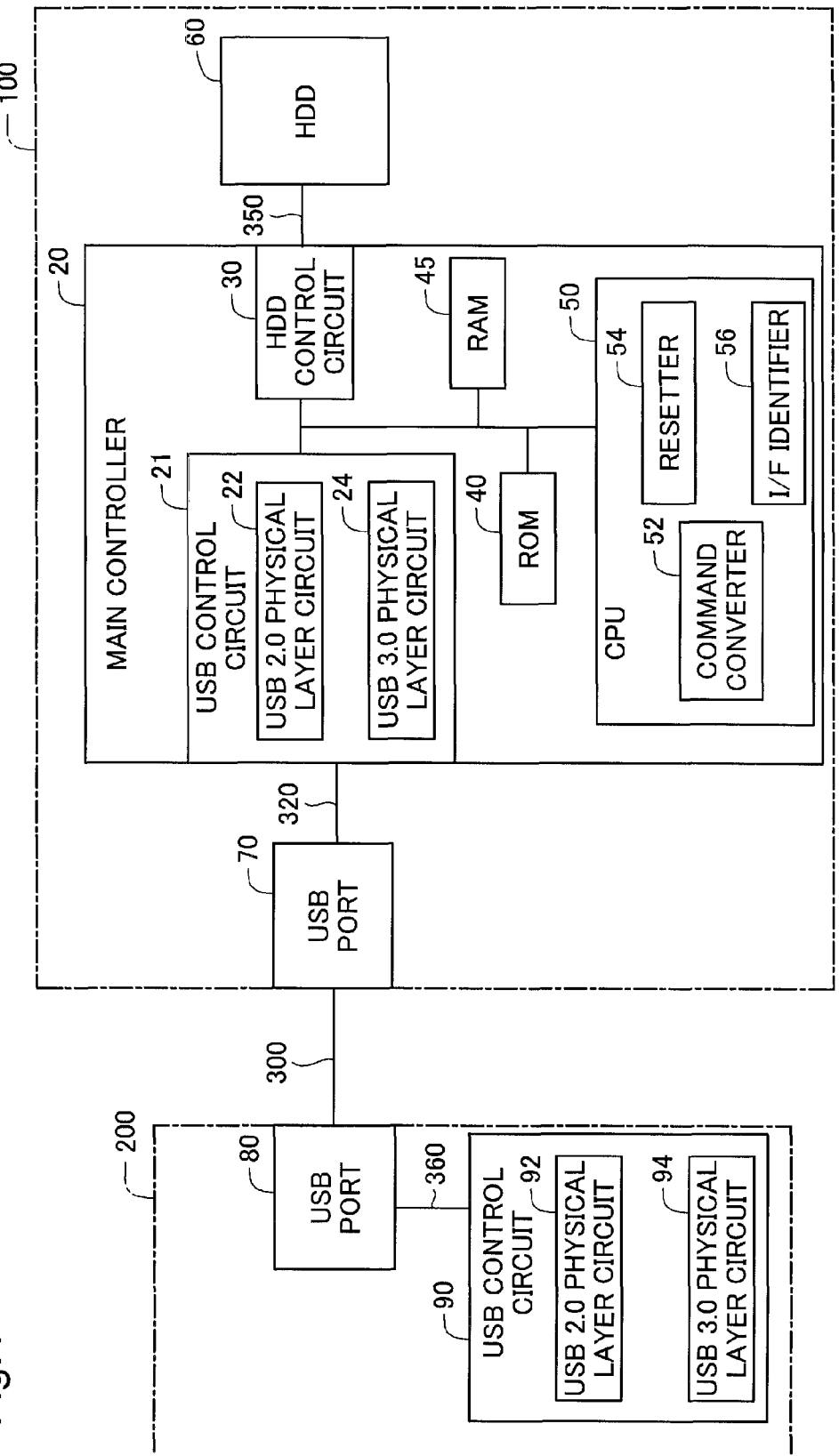
FIG. 1 shows in block diagram the general configuration of an external storage device as a peripheral device according to a first embodiment of the invention.

Some modes of carrying out the invention are described below in the following sequence:
A. First Embodiment
B. Second Embodiment
C. Modifications A. First Embodiment A-1. General Configuration of Peripheral Device FIG. 1 shows in block diagram the general configuration of a peripheral device as a first embodiment of the invention. For the simplicity of explanation, in FIG. 1, a peripheral device 100 is shown as being physically connected with a host device 200 via a cable 300. In the first embodiment, an external storage device 100 is used as the peripheral device 100, and a personal computer (hereafter referred to also as PC) 200 is used as the host device 200.

The external storage device 100 includes a main controller 20, a hard disk drive (hereafter referred to also as 'HDD') 60, and a USB port 70.

The USB port 70 is formed in compliance with the USB 3.0 standard (hereafter referred to as USB 3.0) and can therefore select between a male connector compliant with the USB 2.0 standard (hereafter referred to as USB 2.0) and a male connector compliant with USB 3.0. In other words, the USB port 70 is the port to which a USB 2.0 Standard-B connector compliant with USB2.0 (hereafter referred to as 'USB 2.0B connector') and a Standard-B connector compliant with USB3.0 (hereafter referred to as 'USB 3.0B connector') can be selectively connected. Here, it is to be noted that the expression "can be selectively connected" means that the USB 2.0B connector can not be connected simultaneously but that only one of them can be connected at a time.

The main controller 20 includes a USB control circuit 21, an HDD control circuit 30, a ROM 40, a RAM 45, and a CPU 50, which are interconnected via an internal bus.

The USB control circuit 21 is logically connected with the PC 200 via the USB cable 300 and a signal line 320 and performs data communication with the PC 200, based on either USB 2.0 or USB 3.0. The USB control circuit 21 includes a USB 2.0 physical layer circuit 22 and a USB 3.0 physical layer circuit 24. The USB 2.0 physical layer circuit 22 converts a USB 2.0 differential signal transferred from the PC 200 via the cable 300 into a digital signal. The USB 3.0 physical layer circuit 24 converts a USB 3.0 differential signal transferred from the PC 200 via the cable 300 into a digital signal.

The HDD 60 is connected with the main controller 20 via a signal line 350. The HDD control circuit 30 controls data reading to and data writing from, the HDD 60. The ROM 40 stores various programs executed by the CPU 50 as discussed later. When the external storage device 100 is started up, these programs are loaded from the ROM 40 onto the RAM 45.

The CPU 50 controls the data communication with the PC 200 via the USB control circuit 21 and the data read and write communication with the HDD 60 via the HDD control circuit 30, according to the various loaded programs.

The CPU 50 has a command converter 52, a resetter 54, and an OF identifier 56 in the form of functionals executed as the various programs. The command converter 52 converts a USB interface signal into a SATA interface signal and a SATA interface signal into a USB interface signal. The command converter 52 has the function of converting signals of various different interfaces into signals compliant with the respective interfaces.

The resetter 54 is used to perform part of a reconnection process described later. The reconnection process is performed after a process for making a logical connection performed by the external storage device 100 in cooperation with the PC 200 (hereafter referred to as 'initial connection process'). The details of the reconnection process and the initial connection process will be described later.

The I/F identifier 56 identifies the type of an interface formed between the external storage device 100 and the PC 200.

The PC 200 includes a USB port 80 and a USB control circuit 90. The USB port 80 and the USB control circuit 90 are interconnected via a signal line 360. The USB port 80 is formed in compliant with USB 3.0 to and enables a male connector compliant with USB 2.0 and a male connector compliant with USB 3.0 to be connected selectively therewith. In other words, the USB port 80 is the port to which a Standard-A connector compliant with USB 2.0 (hereafter referred to as 'USB 2.0A connector') and a Standard-A connector compliant with USB 3.0 (hereafter referred to as 'USB 3.0A connector') can be selectively connected. The USB control circuit 90 is logically connected with the external storage device 100 via the USB cable 300 and the signal line 320, and performs data communication with the external storage device 100, based on either USB 2.0 or USB 3.0. The USB control circuit 90 includes a USB 2.0 physical layer circuit 92 and a USB 3.0 physical layer circuit 94. Like the physical layer circuits 22 and 24 of the external storage device 100 described above, the physical layer circuits 92 and 94 respectively convert a USB 2.0 differential signal and a USB 3.0 differential signal into corresponding digital signals. Although the PC 200 obviously includes a CPU, a ROM, and other internal components in addition to the above-mentioned components, only the internal components to be actually explained are shown in FIG. 1.

A-2. Initial Connection Process

Figure 2A:
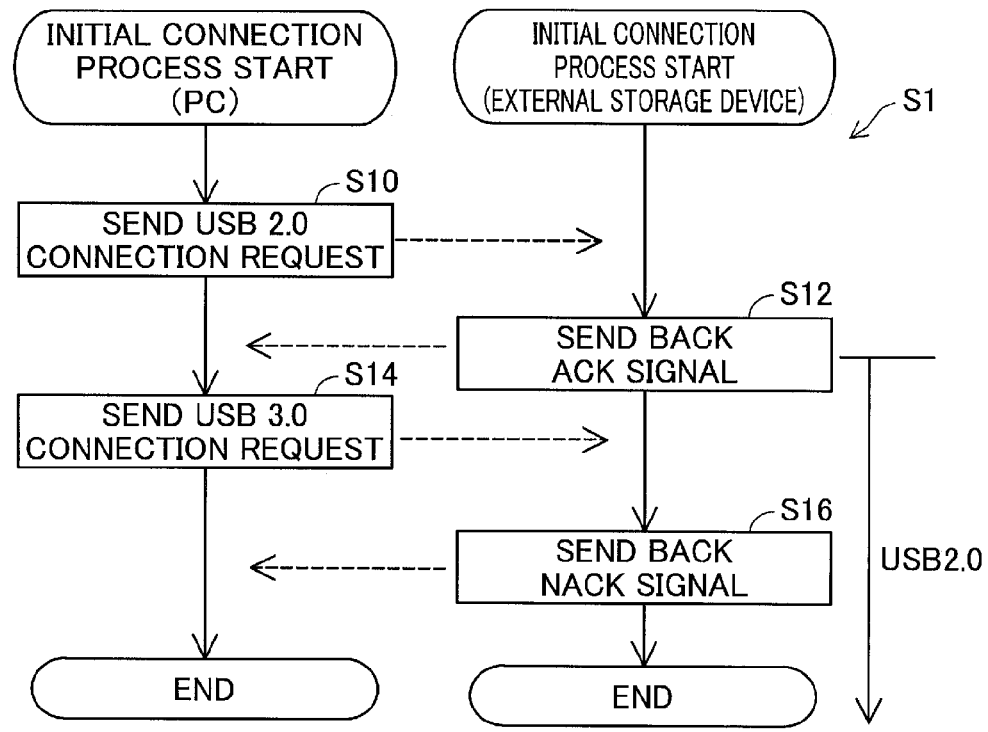
FIGS. 2A and 2B illustrate a process performed by a peripheral device in cooperation with a host device.
Figure 2B:
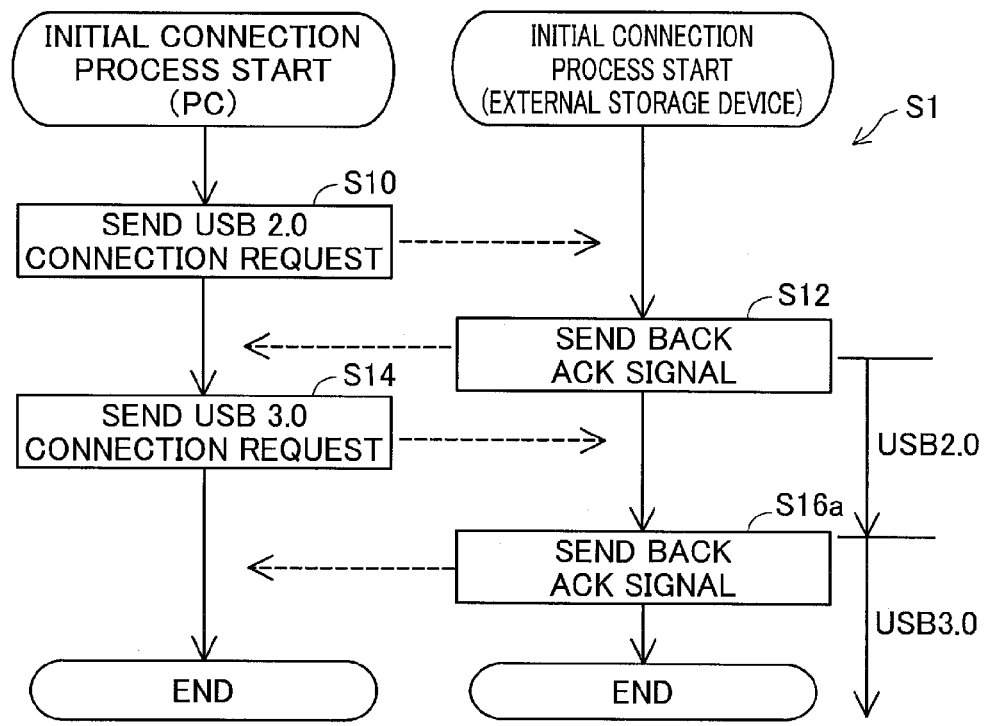

FIGS. 2A and 2B illustrate the initial connection process (step S1) performed by a peripheral device, in cooperation with a host device. FIG. 2A shows the case where the USB 2.0 interface has been formed as a result of the initial connection process, in spite of the fact that the external storage device 100 and the PC 200 are physically connected with each other, via the USB 3.0 cable 300. FIG. 2B shows the case where the USB 3.0 interface has been formed as a result of the initial connection process when the physical connection is made between the external storage device 100 and the PC 200 by means of the USB 3.0 cable 300. The initial connection process described below is performed by the main controller 20 of the external storage device 100, in cooperation with a main controller (not shown) of the PC 200. The following explanation is on the assumption that a user inserts a USB 3.0A connector at one end of the USB cable 300 into the USB port 80 (FIG. 1), while a USB 3.0B connector at the other end of the USB cable 300 is physically connected with the USB port 70 and the respective terminals of the USB 3.0-compliant USB port 70 are in contact with the corresponding terminals of the USB 3.0B connector. Hereafter the physical connection may be simply referred to as 'connection'.

As shown in FIG. 2A, when the external storage device 100 as the peripheral device is connected with the PC 200 as the host device via the USB cable 300, the PC 200 sends a USB 2.0 connection request signal for making a logical connection using the USB 2.0 interface to the external storage device 100 (step S10). On successful reception of the USB 2.0 connection request signal, the external storage device 100 sends back an ACK signal representing successful signal reception to the PC 200 (step S12). A logical connection via the USB 2.0 interface is then made between the external storage device 100 and the PC 200. The logical connection made via the USB 2.0 interface enables data communication via the USB 2.0 interface between the external storage device 100 and the PC 200.

The PC 200, which has received the ACK signal as a reply to the USB 2.0 connection request signal, subsequently sends a USB 3.0 connection request signal for making a logical connection via the USB 3.0 interface to the external storage device 100 (step S14). In case where the external storage device 100 did not normally receive the USB 3.0 connection request signal, the external storage device 100 sends back an NACK signal representing the failure of signal reception to the PC 200 (step S16). As a result, the logical connection using the USB 3.0 interface is not formed, bit, the USB 2.0 interface is maintained. This means that as a result of the processing flow of the initial connection process shown in FIG. 2A, the PC 200 falsely recognized the external storage device 100 as a USB 2.0 device.

On the other hand, as shown in FIG. 2B, in case where the external storage device 100 normally received the USB 3.0 connection request signal from the PC 200, the external storage device 100 sends back an ACK signal to the PC 200 (step S16a). This makes a logical connection via the USB 3.0 interface, instead of the USB 2.0 interface, and enables data communication via the USB 3.0 interface.

In the following is described the reason why data communication via a falsely recognized USB interface (e.g., USB 2.0 interface in FIG. 2A) starts in the application of the single USB ports 70 and 80 designed to selectively allow for connection with either one of the USB 2.0 connector and the USB 3.0 connector, having different electrical specifications.

The USB 3.0A connector to be connected to the USB port 80 of the PC 200 as the host device has an internal structure including five USB 3.0-compliant signal lines in addition to four USB 2.0-compliant signal lines. The five USB 3.0-compliant signal lines are located in a deeper position in the USB 3.0A connector as compared with the four USB 2.0-compliant signal lines. Therefore, when the user inserts the USB 3.0A connector into the USB port 80 of the PC 200 in the state that the USB 3.0B connector is normally connected with the USB port 70 (that is, in the state that the respective terminals of the USB 3.0B connector are in contact with the corresponding terminals of the USB port 70), the following case may happen. That is, the USB 2.0-compliant terminals of the USB port 80 come first into contact with the USB 2.0-compliant terminals of the USB 3.0A connector. That is, it is possible that while the USB 2.0-compliant terminals make electrical connection between the external storage device 100 and the PC 200, the USB 3.0-compliant terminals do not have such electrical connection.

At the time when at least part of the USB 2.0-compliant terminals make electrical connection, the USB 2.0 connection request signal is sent from the PC 200 to the external storage device 100 to start the initial connection process. When the initial connection process is finished before the completion of electrical connection of the USB 3.0-compliant terminals, the PC 200 falsely recognizes the external storage device 100 as a USB 2.0 device. Even when electrical connection of the USB 3.0-compliant terminals is made after the completion of the initial connection process, data communication is conducted via the USB 2.0 interface.

Such false recognition may occur even when the user inserts the USB 3.0B connector into the USB port 70 of the external storage device 100 in the state that the USB 3.0A connector is normally connected with the USB port 80 (i.e., in the state that the respective terminals of the USB 3.0A connector are electrically connected with the corresponding terminals of the USB port 80). This is because if the initial connection process is started while the user is still holding the USB 3.0B connector after the user has inserted the USB 3.0B connector into the USB port 70, then the respective USB 3.0 compliant terminals of the USB 3.0B connector may sometimes be in unstable electric connection with the corresponding USB 3.0 compliant terminals of the USB port 70.

Once the PC 200 recognizes the external storage device 100 as a USB 2.0 device as a result of the initial connection process, even when electrical connection is made between the external storage device 100 and the PC 200 via the USB 3.0-compliant terminals after the initial connection process, data communication is not conducted via the USB 3.0 interface but is performed via the USB 2.0 interface. The external storage device 100 of the embodiment accordingly performs, in cooperation with the PC 200, a series of steps of connection process described below.

A-3. Series of Connection Processes

Figure 3:
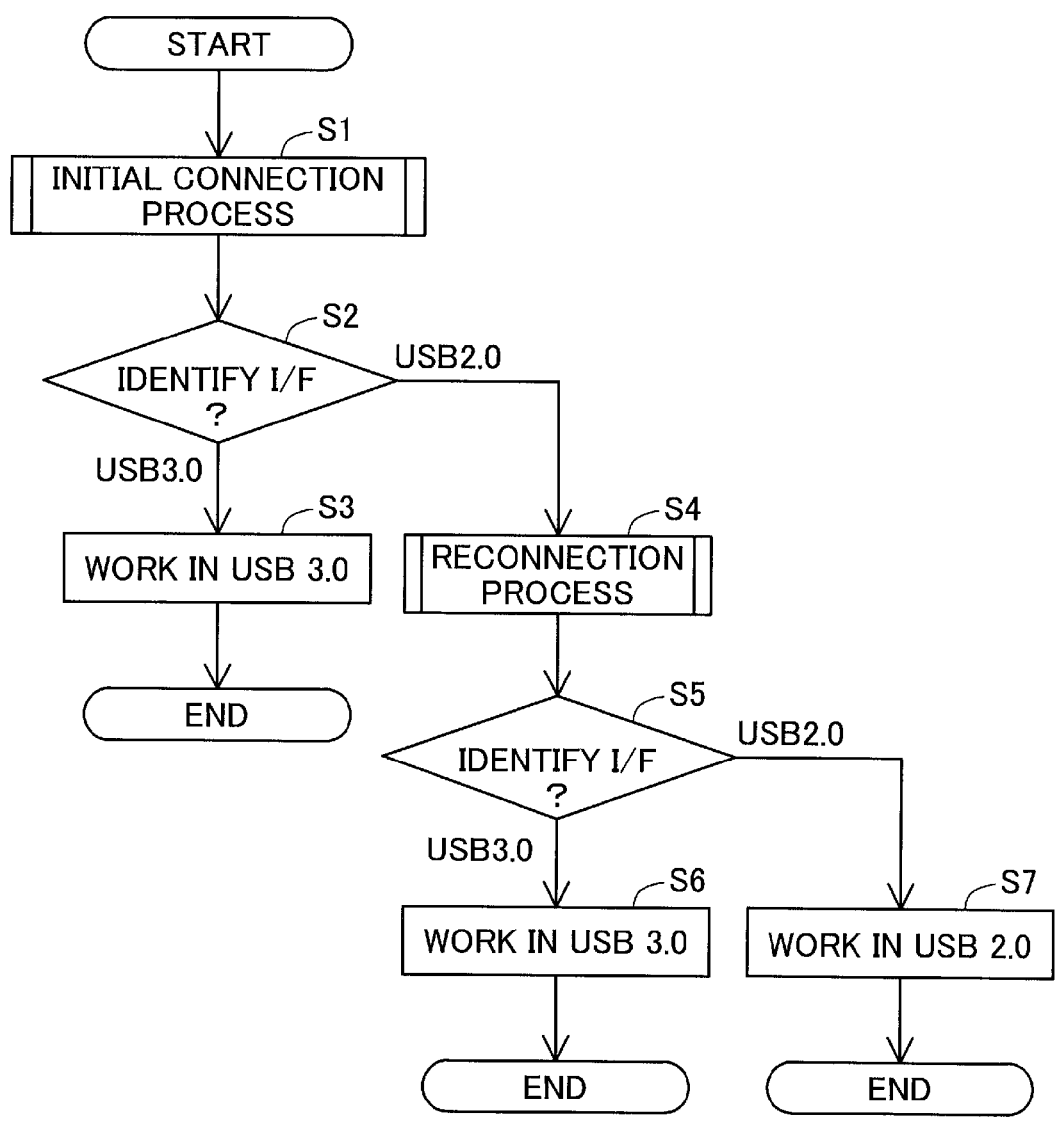
FIG. 3 is a flow chart for explaining a series of steps of connection process performed by the external storage device in cooperation with the PC.

FIG. 3 is a flow chart for explaining a series of connection processes performed by the external storage device 100, in cooperation with the PC 200.

After the initial connection process (step S1) performed by the external storage device 100 in cooperation with the PC 200, the I/F identifier 56 (FIG. 1) of the external storage device 100 identifies the type of interface formed between the external storage device 100 and the PC 200 (step S2).

When the formed interface is identified as a USB 3.0 interface, the external storage device 100 enables data communication via the USB 3.0 interface with the PC 200 without requiring the retransmission of the USB 2.0 connection request signal from the PC 200 (step S3). That is, when the formed interface is identified as a USB 3.0 interface, the external storage device 100 terminates the connection process without performing a reconnection process (described below) in cooperation with the PC 200.

When the formed interface is identified as a USB 2.0 interface, on the other hand, the external storage device 100 performs the reconnection process (step S4) which includes the process of causing the resetter 54 to send the USB 2.0 connection request signal to the PC 200. In other words, the reconnection process (Step S4) is the process which breaks the logical connection formed as a result of the initial connection process (Step S1) and resumes another connection process. The details of this reconnection process (step S4) will be described later.

After the reconnection process, the I/F identifier 56 identifies the type of interface formed by the reconnection process (step S5). When the formed interface is identified as a USB 3.0 interface, the external storage device 100 can perform data communication via the USB 3.0 interface with the PC 200 (step S6). When the formed interface is identified as a USB 2.0 interface, on the other hand, the external storage device 100 can perform data communication via the USB 2.0 interface with the PC 200 (step S7).

A-4. Reconnection Process

Figure 4:
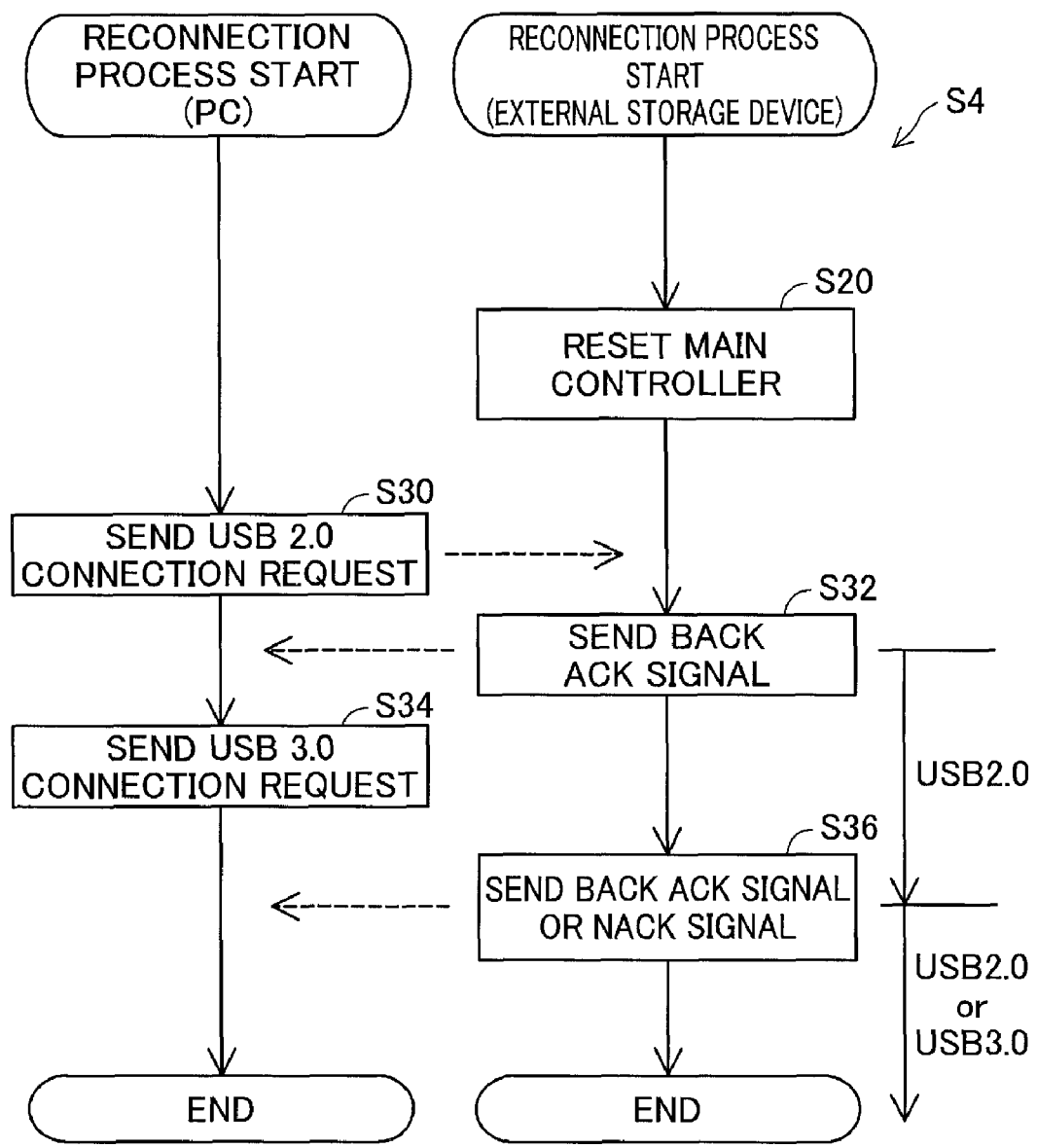
FIG. 4 illustrates a reconnection process performed by the external storage device 100 in cooperation with the PC 200.

FIG. 4 illustrates the reconnection process performed by the external storage device 100, in cooperation with the PC 200. This reconnection process is performed without terminating the physical connection between the external storage device 100 and the PC 200, i.e., without requiring the cable 300 for connecting the external storage device 100 with the PC 200 to be unplugged and re-plugged.

When the interface formed at step S1 is identified as a USB 2.0 interface, the resetter 54 of the external storage device 100 resets the main controller 20 (step S20). That is, the resetter 54 restores the main controller 20 to its initial state. The 'initial state' herein indicates the state of the main controller 20 when the external storage device 100 is turned off. In other words, the 'initial state' may be the state that the programs in the ROM 40 have not yet been loaded onto the RAM 45. In step S20 is broken the logical connection established between the external storage device 100 and the PC 200 by the initial connection process (step S1).

After the termination of the logical connection, a series of process similar to the initial connection process explained above with reference to FIGS. 2A and 2B are performed. That is, the PC 200 sends the USB 2.0 connection request signal and the USB 3.0 connection request signal to the external storage device 100, and the external storage device 100 sends back replies corresponding to the received signals to the PC 200 (steps S30, S32, S34, and S36).

As described above, the external storage device 100 of the embodiment can break the once formed logical connection and make a logical connection again without requiring the user to disconnecting and then connecting the cable 300. Also, the reconnection process (step S4) is performed after the initial connection process (step S1). In doing so, the possibility that the respective USB 3.0-compliant terminals of the USB connector are in stable electric connection with the corresponding USB 3.0-compliant terminals of the USB port 70 or 80, is higher in the reconnection process (step S4) than in the initial connection process (step S1). The reconnection process (step S4) thus effectively lowers the possibility that the PC 200 falsely recognizes the external storage device 100 as a USB 2.0 device. This enables data communication between the external storage device 100 and the PC 200 via a desired interface having a higher data transmission rate (USB 3.0 interface in this embodiment).

It should be noted here that the USB port 70 corresponds to the 'single connector' included in the peripheral device of the invention and the host controller 20 corresponds to the 'controller' included in the peripheral device of the invention.

B. Second Embodiment

Figure 5:
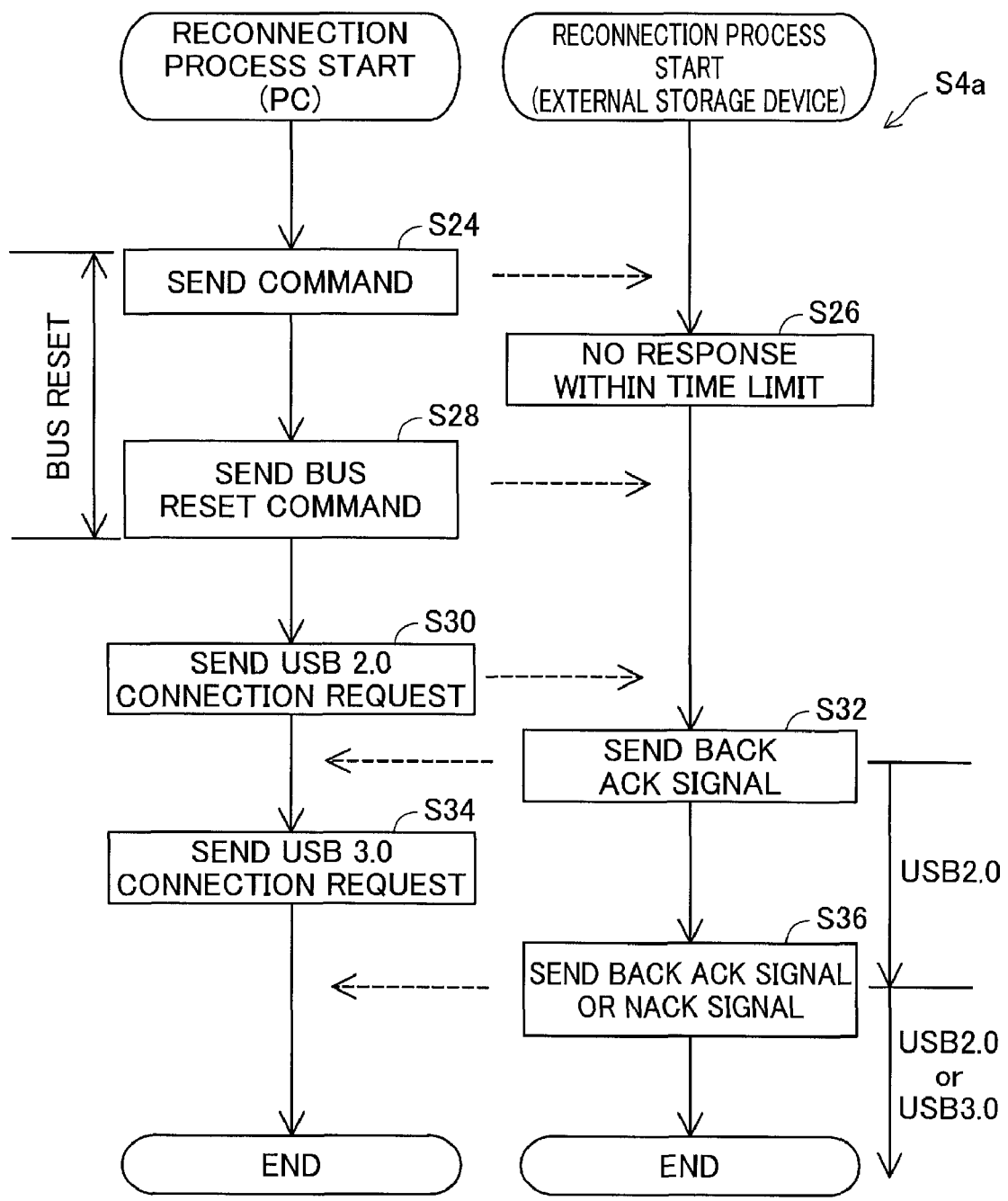
FIG. 5 illustrates a reconnection process performed by an external storage device 100 of a second embodiment in cooperation with the PC 200.

FIG. 5 illustrates a reconnection process performed by an external storage device 100 of a second embodiment, in cooperation with the PC 200. The difference from the external storage device 100 of the first embodiment is only the software configuration of the resetter 54. There is no difference in hardware configuration between the external storage device 100 of the second embodiment and the external storage device 100 of the first embodiment. Therefore, the difference in the software configuration of the resetter 54 is described below with reference to FIG. 5. A series of connection process performed in the second embodiment differ from the series of connection process performed in the first embodiment in the details of the reconnection process.

When the interface formed in step S1 (FIG. 3) is identified as a USB 2.0 interface, the resetter 54 causes the PC 200 to send a bus reset command. After the initial connection process (step S1, FIG. 3), the PC 200 sends a command for confirming the existence of the external storage device 100 (hereafter referred to also as 'test unit ready command') to the external storage device 100 (step S24). The resetter 54 controls the external storage device 100 so that the external storage device 100 may not respond to this test unit ready command within a preset time period (step S26). The PC 200 accordingly sends the bus reset command to the external storage device 100 to perform a bus reset operation. This bus reset thereby breaks the logical connection made by the initial connection process. This state is equivalent to virtually unplugging the USB cable 300. After the termination of the logical connection, the external storage device 100 performs, in cooperation with the PC 200, a series of processing steps similar to those of the initial connection process as explained in the first embodiment (steps S30, S32, S34, and S36).

As described above, the resetter 54 in the external storage device 100 of the second embodiment causes the PC 200 to send the bus reset signal, breaks the once formed logical connection, and then causes the external storage device 100 to perform a process for forming a new logical connection. Accordingly, since the step of rendering the main controller 20 to the initial state in the reconnection process is not required, it is not necessary to load the various programs stored in the ROM onto the RAM 45 again. Thus, the external storage device 100 of the second embodiment has the effect of completing the reconnection process within a shorter time period, in addition to the effects of the first embodiment.

C. Modification

Among the various constituents included in the embodiments discussed above, those other than the constituents included in the independent claims are additional and therefore may be omitted as required. Moreover, this invention is not limited to the embodiments and their applications discussed above but can be implemented in various other modes of practice without departing from the scope of the invention. For example, the following modifications are possible.

C-1. Modification 1

Figure 6:
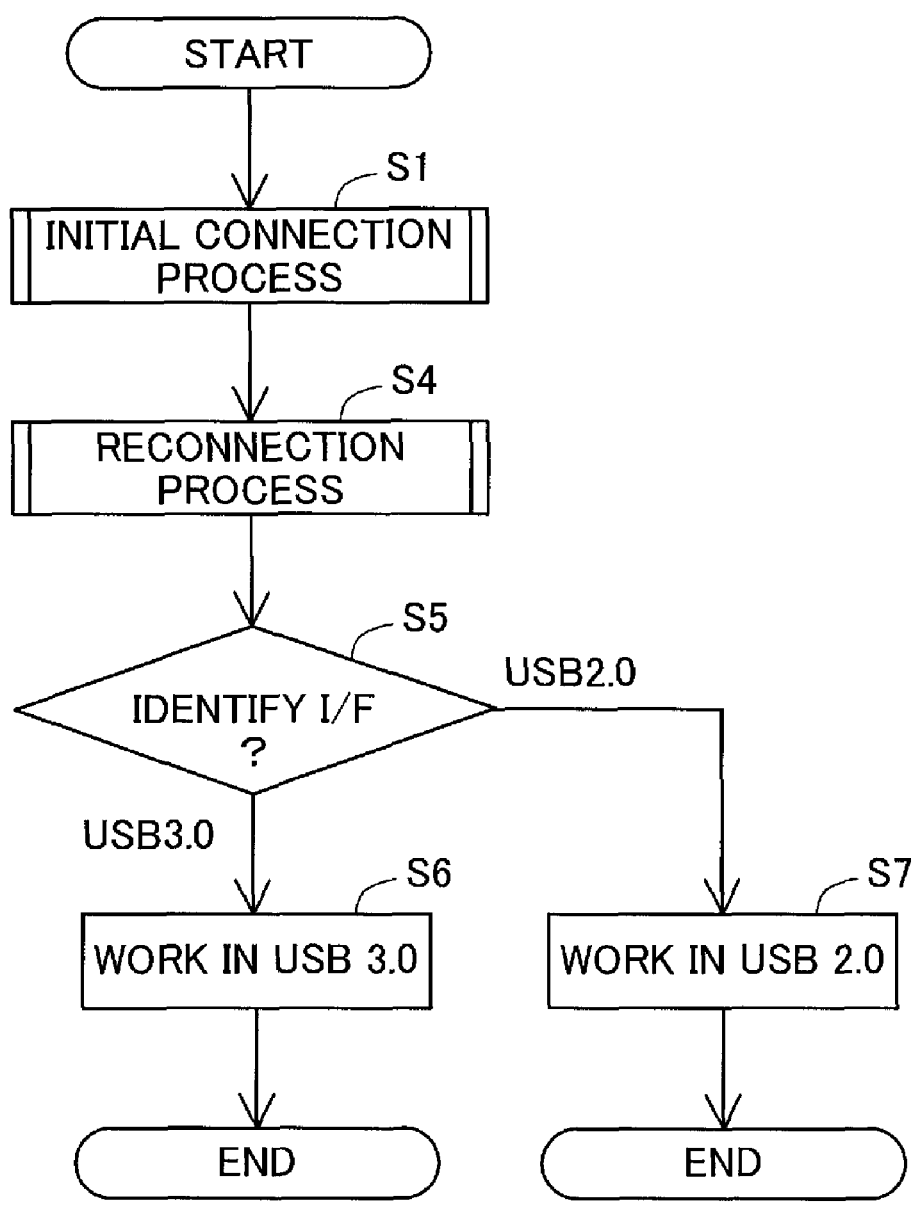
FIG. 6 is a flow chart for explaining a series of steps of connection process performed in a first modification.

FIG. 6 is a flow chart for explaining a series of steps of connection process performed in a first modification. The difference from the connection process (FIG. 3) of the embodiment described above is the exclusion of steps S2 and S3. The other steps of connection process in the first modification are identical with that of the embodiment. Like steps are indicated at like step numbers and are not explained herein.

In the series of connection process of the first modification, the external storage device 100 performs the reconnection process (step S4), in cooperation with the PC 200 irrespective of whether the interface formed by the initial connection process (step S1) is a USB 3.0 interface or a USB 2.0 interface. The reconnection process performed here may be the reconnection process (step S4a, FIG. 5) of the second embodiment. In that case, too, the first modification has the same effects as the above embodiment. Further, the series of connection process of the first modification excludes the identification of the interface type by the I/F identifier 56 immediately after the initial connection process and the subsequent control for determining the necessity of the reconnection process on the basis of corresponding to the identified interface type by the main controller 20. The control of the connection process is thus simplified, as compared with the control of the correction process of the embodiment described above.

C-2. Modification 2

The above embodiments describe the external storage device 100 with the built-in HDD 60 as the peripheral device of the invention. The peripheral device of the invention is, however, not restricted to the HDD-equipped external storage device but may be any of external storage devices with various recording media, such as a flash memory and an optical disk, incorporated therein. In addition, the principle of the invention is applicable to other diverse electronic devices, such as a printer, a camera, and a tuner for a digital television, as well as the external storage device. Further, the host device is not restricted to the personal computer but may be any of various computer devices working as computing apparatuses.

C-3. Modification 3

In the embodiments described above, the USB 2.0 interface and the USB 3.0 interface are adopted as two different types of interfaces having different communication systems. This is, however, neither essential nor restrictive. The present invention is applicable to any of various interfaces that are selectively usable with a single connector (port).

C-4. Modification 4

In the reconnection process of the second embodiment, the resetter 54 is supposed not to respond to the preset command, in order to send the bus reset command to the PC 200 (steps S24 to S28, FIG. 5). This is, however, neither essential nor restrictive. For example, the resetter 54 may send to the PC 200 a signal for sending the bus reset command. This modification has the same effects as the second embodiment.

C-5. Modification 5

In the embodiments described above, part of the software configuration may be replaced with equivalent hardware configuration, or part of the hardware configuration may be replaced with equivalent software configuration.

While the present invention has been described with reference to exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including fewer elements or only a single element, are also within the spirit and scope of the invention.

What is claimed is:

1. A peripheral device for performing data communication with a host device via one of a first-type interface and a second-type interface having different data-communication-related specifications, comprising:

a single connector that is to be connected selectively with one of a first-type connector corresponding to the first-type interface and a second-type connector corresponding to the second-type interface; and
a controller for performing an initial connection process that is started by a signal sent from the host device when the peripheral device and the host device are physically connected with each other by using one of the first-type connector and the second-type connector, and that makes a logical connection between the peripheral device and the host device via one of the first-type interface and the second-type interface,
wherein the second-type connector includes terminals using data communication via the second-type interface in addition to terminals using data communication via the first-type interface,
wherein at least part of the terminals using data communication via the second-type interface are located in a deeper position as compared with the terminals using data communication via the first-type interface, and
wherein the controller can perform a reconnection process that breaks the logical connection made by the initial connection process and then makes the logical connection between the peripheral device and the host device, while the physical connection is maintained.

2. The peripheral device in accordance with claim 1,
wherein the second-type interface has a higher data transmission rate than the first-type interface, and
when the controller identified the logical connection formed by the initial connection process as a connection via the first-type interface, the controller performs the reconnection process, and
when the controller identified the logical connection formed by the initial connection process as a connection via the second-type interface, the controller does not perform the reconnection process.

3. The peripheral device in accordance with claim 1,
wherein the controller performs both the initial connection process and the reconnection process, irrespective of whether the physical connection between the peripheral device and the host device is made by using one of the first-type connector and the second-type connector.

4. The peripheral device in accordance with claim 1,
wherein the reconnection process includes a step of breaking the logical connection formed by the initial connection process as a result of the controller having entered into its initial state.

5. The peripheral device in accordance with claim 1,
wherein the reconnection process includes a step of breaking the logical connection formed by the initial connection process by causing the host device to send a bus reset signal to the peripheral device.

6. The peripheral device in accordance with claim 1,
wherein the first-type interface complies with USB 2.0, and the second-type interface complies with USB 3.0.

7. A method of making establishing a logical connection between a host device and a peripheral device, which enable performance of data communication by selectively using one of a first-type interface and a second-type interface having different data communication-related specifications, the method comprising:
an initial connection step that is started by a signal sent from the host device to the peripheral device when the peripheral device and the host device are physically connected with each other by means of the first-type connector corresponding to the first-type interface or the second-type connector corresponding to the second-type interface, and that makes a logical connection between the host device and the peripheral device by using the first-type or second-type interface; and
a reconnection step that breaks the logical connection made by the initial connection step and then makes another logical connection between the peripheral device and the host device, while the physical connection is maintained;
wherein the second-type connector includes terminals using data communication via the second-type interface in addition to terminals using data communication via the first-type interface, and
wherein at least part of the terminals using data communication via the second-type interface are located in a deeper position as compared with the terminals using data communication via the first-type interface.

8. The peripheral device in accordance with claim 1,
wherein the controller identifies the type of interface forming the logical connection and then selectively performs the reconnection process depending on the type of interface.

9. The peripheral device in accordance with claim 8, wherein,
the second-type interface has a higher data transmission rate than the first-type interface, and
when the controller identifies the interface as the first-type interface, the controller performs the reconnection process, and
when the controller does not identify the interface as the first-type interface, the controller does not perform the reconnection process.

10. The peripheral device in accordance with claim 1, wherein the controller is configured to,
perform the initial connection process upon an initial electrical connection between said host device and said peripheral device, and
perform the reconnection process when the electrical connection between said host device and said peripheral device is completed.

* * * * *